United States Patent [19]

Clarey

[11] 4,241,507
[45] Dec. 30, 1980

[54] APPARATUS AND METHOD FOR THE DETERMINATION OF TENTER WIDTH VARIANCE IN A CARPET OR TEXTILE DRYING OVEN

[75] Inventor: Donald H. Clarey, Dalton, Ga.

[73] Assignee: The Dow Chemical Company, Midland, Mich.

[21] Appl. No.: 15,516

[22] Filed: Feb. 26, 1979

[51] Int. Cl.³ .................................................. G01B 5/04
[52] U.S. Cl. .............................. 33/125 R; 33/143 L; 33/147 L; 26/91
[58] Field of Search ................. 33/125 R, 144, 146, 33/143 L, 147 L; 26/96, 91

[56] References Cited
U.S. PATENT DOCUMENTS

| | | | |
|---|---|---|---|
| 2,832,148 | 4/1958 | Rousse | 33/144 |
| 3,382,554 | 5/1968 | Harmon et al. | 26/91 |

FOREIGN PATENT DOCUMENTS 747571  8/1952  Fed. Rep. of Germany .............. 26/96

Primary Examiner—William D. Martin, Jr.
Attorney, Agent, or Firm—James B. Guffey

[57] ABSTRACT

An apparatus is provided for detecting the presence of, for measuring the magnitude of, and for determining the location of, variations in the distance between the tenter chains in a carpet drying oven. Such apparatus facilitates the measurement of the distance between the tenter chains at various positions along the length of the oven without the need for prolonged shut-down of the oven as has heretofore been required for manual obtention of such measurements. In addition, the instant apparatus allows such measurement to be made while the tenter is under tension due to the weight of the carpet thereon.

2 Claims, 3 Drawing Figures

APPARATUS AND METHOD FOR THE DETERMINATION OF TENTER WIDTH VARIANCE IN A CARPET OR TEXTILE DRYING OVEN

BACKGROUND OF THE INVENTION

In the manufacture of carpeting and other textile materials, it is conventional practice to apply thereto various chemical agents such as backsizing agents, adhesives, foam backings, and the like, and to thereafter dry and/or cure such applied chemical agents at elevated temperatures by passing the treated carpet or textile substrate through a drying oven. In such drying and/or curing operation, the treated substrate is typically supported at each longitudinal edge thereof by one of two tenter chains (or tenter cables) each of which have tenter pins affixed thereto for securing said substrate to the respective tenter chain. Such chains or cables are in turn supported and guided through the oven by tenter rails (or tenter channels) and such chains or cables are in a continuous fashion, circulated or rotated through said oven, thereby transporting the treated substrate therethrough.

The drying ovens employed in the aforementioned drying/curing operation (and the tenter chains or cables and the tenter rails or channels thereof) are typically fairly long (e.g., in the range of up to 100 or 200 feet in length or more) in order to provide sufficient residence time in the oven to adequately dry and/or cure the treated substrate as it passes therethrough. Further, the width of such ovens (and thus the maximum possible distance between the supporting tenters) is also typically substantial (e.g., on the order of 15 feet or more) in order to accommodate the largest carpeting or textile material widths currently in common usage. Moreover, the drive means (e.g., sprockets, pulleys, etc.) for the tenter chain (or tenter cables) and the tenter rails (or channels) therefor are typically adjustable (a) in order that the distance between such rails or channels (and between the tenter chains or cables supported thereby) can be adapted to accommodate carpeting or textiles of various widths and (b) in order that individual sections of each of the tenter rails can be aligned in a fashion such that the tenter chains supported thereby form 2 generally straight and generally parallel lines throughout the length of the oven (i.e., such that the distance between each set of such tenter rail or channel sections is substantially the same along the length of said oven).

Often during use of the above-described drying ovens, the supporting tenter rails or channels, and thus the tenter chains or cables supported thereby, can become misaligned (e.g., one or more sets of the tenter rail sections can be initially misadjusted or can become misaligned through normal wear, breakage, etc., such that the distance therebetween is not substantially the same along the entire length of the drying oven) with the result that the tenter chains or cables do not maintain the desired generally parallel relationship relative to each other as they traverse the length of said oven. Such misalignment can be very troublesome and costly in that it can cause product defects such as loose backing in carpeting (commonly referred to as "loose jute"), etc., and can thereby lead to substandard or defective material requiring special treatment for repair or salvaging thereof or perhaps being incapable of being salvaged at all. Moreover, when such product defects are detected, it often becomes necessary to shut down production and to check the tenter rail or channel alignment to determine if misalignment is the cause thereof.

In checking for the aforementioned problem of tenter misalignment, it has generally been the practice of the industry (a) to shut down production, (b) to remove the treated substrate from the oven, (c) to permit the oven to cool down to approximately ambient temperature, (d) to manually measure the distance between the tenter chains (or cables) at the numerous sets of supporting tenter rail or channel sections along the oven length, (e) to make adjustments necessary to properly align any set of such rail sections found to be out of alignment and (f) finally, to reheat the oven to operating temperature and thereafter to restart production. In addition, in step (d), above, it is also generally necessary to attach a tensioning device across the individual sets of tenter rail sections during the measurement thereof to simulate the weight of the treated substrate thereon since often times a misalignment problem may be apparent (and thus detectable) only under such circumstances.

Naturally, the aforementioned method of checking tenter alignment has several serious drawbacks not the least of which include the substantial unproductive "down time" and energy resource wastage involved in cooling and reheating such a typically massive drying oven as well as the substantial "down time" involved in manually applying tension to, and measuring the width of, each of the numerous sets of tenter rail or channel sections in such an oven. Accordingly, it is highly desirable to provide a means by which the aforementioned measurement can be quickly and accurately accomplished without the above-described disadvantages which are attendant to the above-noted manual methods.

SUMMARY OF THE INVENTION

In accordance with the present invention, such desired means for quickly and accurately determining the existence, magnitude and location of tenter misalignment is provided. Thus, in one aspect, the instant invention is an apparatus for detecting the existence, magnitude and location of variations in the distance between tenter chains or tenter cables in a carpet or textile drying oven, which apparatus comprises: (A) a position or distance sensing transducer (1) which is equipped with means for transmitting to the transducer differences in the distance between the tenter chains or cables as such chains or cables and said transducer traverse the length of said oven and (2) which generates a signal proportional to the difference in distance between said tenter chains or cables; (B) a signal receiver to receive and display and/or record the signal from said transducer; (C) means for transmitting said signal from said transducer to said receiver and (D) means for determining the position of said transducer in said oven.

Additionally, in another aspect, this invention is a method for detecting the existence, magnitude and location of variations in the distance between the tenter chains or cables along the length of a carpet or textile drying oven, which method comprises the steps of: (a) affixing the transducer of the above-described apparatus to the tenter chains, or to the edges of a substrate (e.g., a carpet, etc.) supported thereby, via the distance difference transmitting means of said transducer; (b) transporting said transducer through said oven by advancing the tenter chains or cables therethrough in substantially the normal fashion (e.g., at either the normal or a reduced speed); and (c) recording the distance between the tenter chains or cables (or differences or variations therein) as a function of location along the length of the oven as the tenter chains or cables and transducer are transported therethrough.

The aforementioned apparatus and method are particularly advantageous in the detection of variations in the distance between the tenter chains or cables in carpet or textile drying ovens in that the tenter alignment can be quickly and conveniently checked without the numerous drawbacks associated with the above-described manual prior art method. In particular, since manual measurement inside the oven is not required, the requirement of cooling the oven to ambient temperature (and thus the subsequent reheating to normal operating temperature from ambient) is thereby eliminated along with substantial down time and energy losses associated therewith. In addition, the substantially down time which was heretofore required for accomplishing the manual measurements themselves is also substantially reduced since the amount of time required to accomplish all needed measurements pursuant to the instant invention is comparatively small. Finally, the instant invention permits checking the alignment of the tenter chains or cables (and thus the alignment of the supporting and guiding tenter rails or channels therefor) without the need for removing any carpet or textile substrate then in the oven therefrom. That is, the additional residence time in the oven (and thus the additional exposure to the elevated temperature therein) which is required for this type of measurement is typically insufficient to detrimentally affect the quality or properties of the carpet or textile material. Thus, such carpet or textile typically need not be removed from the oven while the desired measurement is performed. Accordingly, the present invention therefore typically eliminates the need for simulating the weight of the treated substrate (i.e., applying tension across the tenter chains or cables) since, pursuant to the invention, the requisite measurements can be made with the actual treated substrate still being in place thereon.

The above and other beneficial aspects of the present invention will hereinafter become more fully apparent in conjunction with the detailed descriptions thereof and the description of the drawings which is presented therewith.

BRIEF DESCRIPTION OF THE DRAWINGS

Referring now to the drawings.

DETAILED DESCRIPTION OF THE INVENTION

Figure 1:
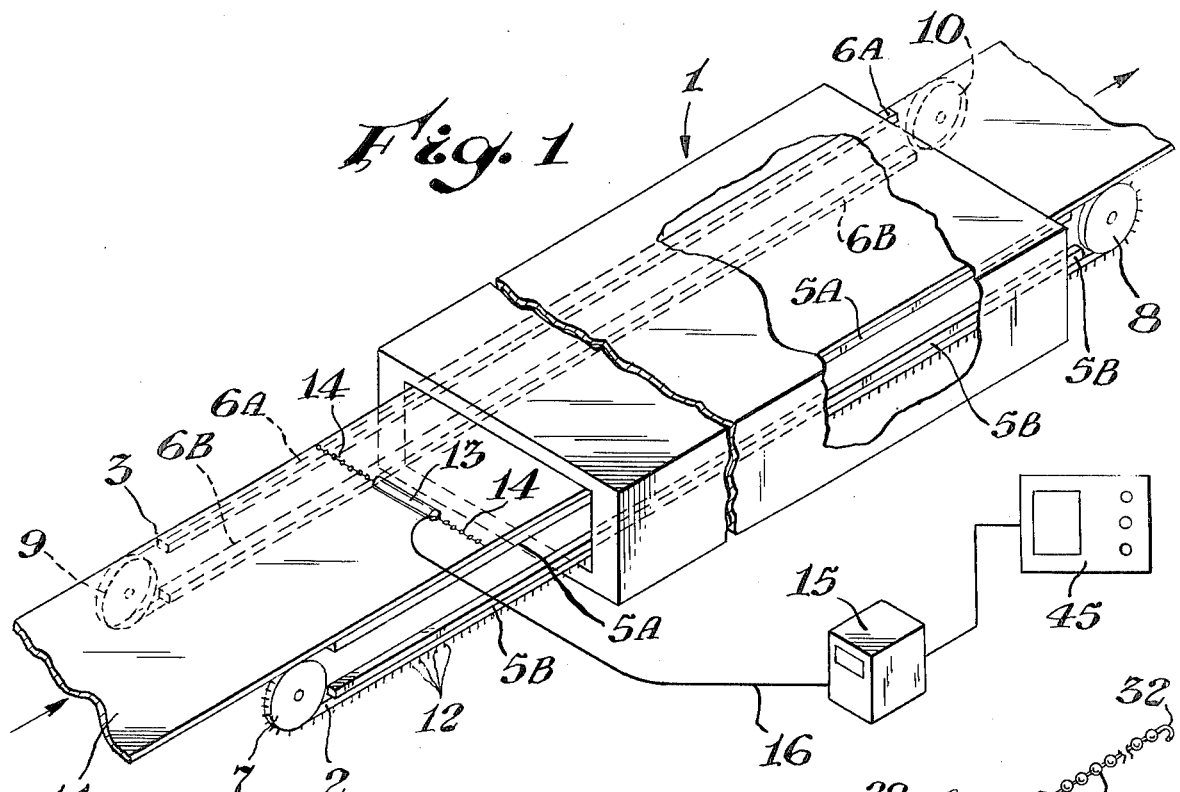
FIG. 1 is a fragmentary schematic isometric, partly cut away, which illustrates the apparatus of the invention and its use in determining variations in the distance between the tenter chains or cables of a carpet or textile drying oven.

In FIG. 1, a carpet or textile drying oven 1 is shown which comprises (a) a housing having a first end and a second end, said first and second ends each having an opening therein to permit entry of material into said oven and exit of said material from said oven and said housing defining a passage extending between said first and second ends and (b) means (not shown) for heating material disposed within said passage. Also shown in FIG. 1 are tenter chains 2 and 3 which pass through the passage of said oven and which serve to transport material to be heated through said passage.

The aforementioned tenter chains in FIG. 1 are supported and guided along the length of the oven by their corresponding sets of tenter rails (i.e., upper rail 5A and lower rail 5B and upper rail 6A and lower rail 6B). Such tenter rails are in turn supported by their respective support members, not shown, and such support members are equipped with means for adjusting the distance between upper rails 5A and 6A. Additionally, the aforementioned tenter chains are also supported near the ends of said tenter rails by sprockets 7, 8, 9 and 10 and at least one set of said sprockets (i.e., sprockets 7 and 9 and/or sprockets 8 and 10) is provided with drive means (not shown) for advancing said tenter chains (and carpeting or textile material supported thereby) through said oven. Also shown in FIG. 1 is a section of a carpet 11 supported by the tenter chains, said carpet being affixed thereto via a plurality of tenter pins 12 on said tenter chains. Finally, FIG. 1 also shows an embodiment of the tenter width measuring apparatus of the invention. In particular, the position sensing transducer 13 (also referred to herein as a distance, or linear displacement, sensing transducer) is shown connected across (and, in this embodiment, substantially perpendicular to) the tenter chains via connecting means (i.e., ball chains) 14 by which differences in the distance between the tenter chains along the length of the oven is transmitted to said transducer. Additionally, in FIG. 1, a suitable signal receiver component 15 for the apparatus of the invention is also illustrated along with a compatible signal transmitting means 16 therefor and, finally, an optional strip chart recording device 45 for automatically plotting variations in the distance between the tenter chains as a function of oven length is also shown.

In the above-described embodiment of FIG. 1 a ball chain was employed as the connecting means 14 and naturally when such connecting means is flexible in nature (e.g., wire, chain, cable, etc.) as opposed to rigid (e.g., rods, tubes, etc.), resilient tensioning means (not shown) such as, for example, a spring or like member should be provided to insure that any reduction of the distance between the tenter chains along the length of the oven will be effectively or reliably transmitted to the transducer so as to cause a corresponding relative displacement of the active sensing members of said transducer. Naturally, however, when such connecting means are rigid in nature, the aforementioned tensioning means is not necessary for the aforesaid purpose. Additionally, in the embodiment of FIG. 1, the signal transmitting means is an electrical cable and the transmitted signal is electrical in nature. However, it will be recognized that said signal instead could suitably be pneumatic or hydraulic in nature or could even take the form of a radio type transmission from a radio transmitting transducer to a suitable signal receiver.

Finally, in the embodiment of FIG. 1, the means for determining position of the transducer in the oven as it passes therethrough (and thus for correlating the measurement signals of the transducer to the corresponding position along the oven length) takes the form of linear distance calibration markings on the signal transmitting means 16 (i.e., an electrical cable in the embodiment of FIG. 1). Naturally, however, other direct means for determining said position can also be suitably employed such as a separate linear distance calibrated member such as a suitably long conventional tape measure, a calibrated wire, cable, cord, etc. Alternatively, said position can be indirectly determined without the use of a measuring device by employing indirect methods such as correlating the time at which the various transducer readings are taken to the corresponding position of the transducer in the oven based upon the linear speed at which the the tenter chains, and thus the transducer, traverse the length of said oven. Such an indirect means can also be readily facilitated, for example, by the use of a strip chart recording device (e.g., such as item 45 in FIG. 1) running at a preset constant speed either in conjunction with or in place of the above-described signal receiver component (i.e., item 15, in FIG. 1 above).

Figure 2:
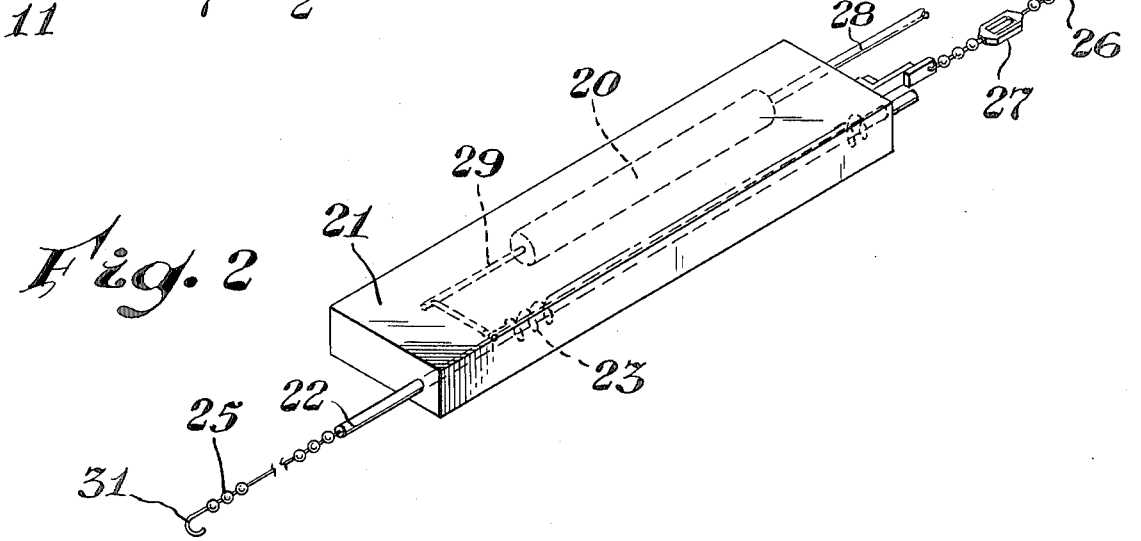
FIG. 2 is a schematic isometric illustrating a transducer suitable for use in the practice of the invention as well as suitable means for transmitting distance differences from the tenter chains to said transducer and suitable means for transmitting signals from said transducer to a remote recorder or display device (not shown).

Turning now to FIG. 2, there is presented a cross-sectional schematic of a distance sensing transducer suitable for use in the practice of the invention. In such figure, a conventional, commerically available displacement sensing transducer 20 is mounted in a housing 21 and is connected to a rod 22 which passes through said housing and which is affixed to a spring 23 which serves to put tension on the connecting ball chains 25 and 26 when said connecting chains are attached to their respective tenter chains (not shown) by their respective end hooks 31 and 32 during use of such apparatus. Also shown in FIG. 2 is a turnbuckle 27 on ball chain 26 to facilitate the adjustment of the transducer to the zero position. Finally, FIG. 2 also shows a suitable electrical cable 28 which is electrically connected to the transducer 20 and which serves to transmit the electrical signal generated by said transducer (said signal being proportional in a known relationship to the changes in linear displacement of the transducer sensing rod 29) to a suitable display and/or recording instrument (not shown).

EXAMPLE

In this example, an apparatus in accordance with the present invention (and partially depicted in FIG. 3) is constructed and is employed to determine the variations in the distance between the tenter chains in a commercial scale carpet drying oven as a function of position along the length of said oven.

Figure 3:
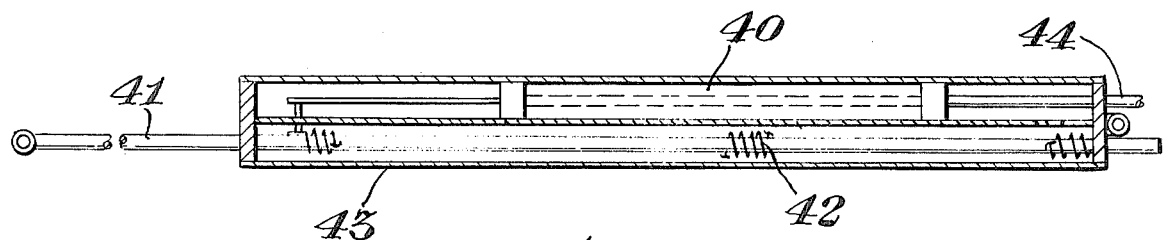
FIG. 3 is a cross-sectional elevational view of a transducer which was constructed and employed to determine the variation in distance between the tenter chains along the length of a commerical scale carpet drying oven as described in the Example which is hereinafter presented.

In constructing such apparatus, a Trans-Tek Displacement Transducer, Series 240, Model 245-000 is employed as the distance sensing transducer member thereof (i.e., item 40 of FIG. 3); a ¼-inch diameter drill rod about 25 inches in length is employed as rod element 41 of FIG. 3; and a 690 W tension spring having an inside diameter of about ⅜ inch and an unextended (i.e., free of tension) length of about 10¼ inches is employed as spring element 42 of FIG. 3.

The housing of the aforementioned apparatus (i.e., element 43 of FIG. 3) is constructed using ¼ inch thick and ⅛ inch thick aluminum sheet stock which is appropriately drilled and tapped (i.e., tapping being into the ¼ inch aluminum sides) to facilitate assembly of such housing and the outer dimensions of such housing is as follows:

Length: about 18 inches

Width: about 1¾ inches, with the elongated sides having such width (i.e., the top and bottom) as well as the end pieces being made from the ¼ inch thick aluminum sheeting Height: 1¼ inches with the elongated sides having such width being made from the ⅛ inch thick aluminum sheeting.

The signal receiver component (i.e., element 15 of FIG. 1) employed herein is a Trans-Tek, Transducer Indicator, Series 1002, Model 1003-0008 having a digital read out meter and, finally, the signal transmitting means connecting said receiver to the aforementioned displacement transducer is a four conductor high temperature resistant electrical cable which is about 150 feet in length and which corresponds to item 16 in FIG. 1, to item 28 in FIG. 2 and to item 44 in FIG. 3. Additionally, in subsequent uses of the instant apparatus (i.e., for other carpet drying ovens) a strip chart recorder corresponding to item 45 in FIG. 1 is employed in conjunction with the above-described digital read out signal receiver component. In such instances, the strip chart recorder employed is a Linear Instruments Corporation Model 142 Strip Chart Recorder having variable (i.e., adjustable) zero, sensitivity and chart speed features.

In using the above-described apparatus to determine the variation in distance between the tenter chains in the aforementioned drying oven, the position sensing transducer is placed across the width of a length of carpet at the inlet end of said oven as illustrated in FIG. 1 and is connected to the opposing tenter chains (i.e., at each edge of the carpet supported thereby) via the end hooks (i.e., items 31 and 32 of FIG. 2) of their respective connecting ball chains (i.e., items 25 and 26, respectively, of FIG. 2). Thereafter, the transducer is connected to the above-described signal receiver (and/or to the strip chart recorder, when used) via the aforementioned electrical cable; said receiver (and/or the strip chart recorder) is connected to a suitable 110 volt, 60 cycle alternating current power supply; and turnbuckle 27 of FIG. 2 is then adjusted to cause a zero reading on the read out meter of the signal receiver (i.e., item 15 of FIG. 1) and/or on the strip chart recorder (i.e., item 45 of FIG. 1) when such latter device is employed.

Upon completion of the above-indicated preliminary connections and after any desired equipment adjustments (e.g., zeroing or calibration of the receiver meter, etc.), the drive mechanism for advancing the tenter chains (and thus the carpet and the transducer which are affixed thereto) through the oven is activated and readings are taken from the transducer indicator at 5 foot intervals along the oven length as the transducer passes therethrough. (Naturally, when the above-described strip chart recorder is employed, the aforementioned five foot interval readings can be dispensed with and the variations in distance between the tenter chains as a function of oven length can instead be directly recorded or plotted by such recorder.)

The readings so obtained in this example are recorded in Table I below and the results thereof indicate that the tenter chains of the particular oven tested are, at the time of such test, in reasonably good alignment along the entire 90 foot length of said oven.

TABLE I

| Position Along the Length of the Oven Starting at the Inlet End (Feet) | Variation in Distance Between Tenter Chains As a Function of Position Along the Oven Length[1,2] |
|---|---|
| Inlet End (or 0 feet) | — |
| 5 | −0.20 inch |
| 10 | −0.24 inch |
| 15 | −0.25 inch |
| 20 | −0.14 inch |
| 25 | −0.04 inch |
| 30 | −0.11 inch |
| 35 | −0.09 inch |
| 40 | −0.11 inch |
| 45 | −0.12 inch |
| 50 | −0.22 inch |
| 55 | −0.29 inch |
| 60 | −0.26 inch |
| 65 | −0.24 inch |
| 70 | −0.23 inch |
| 75 | −0.22 inch |
| 80 | −0.26 inch |
| 85 | −0.27 inch |
| 90 | −0.35 inch |

[1] Distance between tenter chains at inlet end of oven = 12'6¼".
[2] The variation measurement is given in terms of the difference in inches in the distance between the tenter chains relative to the distance between them at the inlet side of the oven, such latter distance being the point at which the apparatus of the invention is adjusted to give a zeroreading.

While the practice of the present invention has been exemplified and illustrated herein with reference to specific embodiments thereof, such exemplification is not to be understood as limiting the scope of the instantly claimed invention.

I claim:

1. An apparatus for detecting variation in the distance between the tenter chains or cables in a carpet or textile drying oven which comprises:
   (A) an electrical position sensing transducer (1) which is capable of being disposed within and transported through said carpet or textile drying oven; (2) which is equipped with a means for transmitting to the transducer differences in the distance between the tenter chains or cables as such chains or cables and said transducer traverse the length of said oven; and (3) which generates an electrical signal proportionate to the difference in the distance between said tenter chains or cables;
   (B) a signal receiver to receive and display and/or record the signal from said transducer;
   (C) an electrical cable for transmitting the signal from said transducer to said receiver; and
   (D) means for determining the position of said transducer in said oven at the point in time when a given transducer signal is generated.

2. A method for detecting variation in the distance between the tenter chains or cables in a carpet or textile drying oven which method comprises the steps of:
   (a) affixing an electrical position sensing transducer between said tenter chains or cables via a means for mechanically transmitting to the transducer differences in the distance between the tenter chains or cables as such chains or cables and said transducer traverse the length of said oven, said transducer being one which generates an electrical signal proportionate to the distance between said tenter chains or cables;
   (b) providing, via a suitable electrical cable, an electrical connection between said transducer and a signal receiver which receiver is located outside of said drying oven and which receives and displays and/or records the signal from said transducer;
   (c) transporting said electrical transducer through said oven by advancing the tenter chains or cables therethrough; and
   (d) recording, based upon the readings provided by said signal receiver, the distance between the tenter chains or cables, or the variation in such distance, as a function of location along the length of said drying oven as said electrical transducer is transported therethrough.

* * * * *